(12) United States Patent
Wu et al.

(10) Patent No.: US 7,783,122 B2
(45) Date of Patent: Aug. 24, 2010

(54) BANDING AND STREAK DETECTION USING CUSTOMER DOCUMENTS

(75) Inventors: Wencheng Wu, Webster, NY (US); R. Victor Klassen, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1075 days.

(21) Appl. No.: 11/487,206

(22) Filed: Jul. 14, 2006

(65) Prior Publication Data

US 2008/0013848 A1 Jan. 17, 2008

(51) Int. Cl.
G06K 9/40 (2006.01)
(52) U.S. Cl. ...................................................... 382/254
(58) Field of Classification Search .................. 382/149, 382/151, 254, 112, 168, 170, 542; 702/35, 702/36, FOR. 125
See application file for complete search history.

(56) References Cited

U.S. PATENT DOCUMENTS

| | | | |
|---|---|---|---|
| 4,121,292 A * | 10/1978 | Galanis et al. | 382/141 |
| 5,272,511 A | 12/1993 | Conrad et al. | |
| 5,435,544 A | 7/1995 | Mandel | |
| 6,377,758 B1 * | 4/2002 | OuYang et al. | 399/15 |
| 6,450,711 B1 | 9/2002 | Conrow | |
| 6,476,376 B1 | 11/2002 | Biegelsen et al. | |
| 6,760,056 B2 | 7/2004 | Klassen et al. | |
| 6,807,510 B1 * | 10/2004 | Backstrom et al. | 702/150 |
| 2002/0106134 A1 * | 8/2002 | Dundon et al. | 382/274 |
| 2005/0023763 A1 * | 2/2005 | Richardson | 273/348 |
| 2005/0240376 A1 * | 10/2005 | Uwatoko et al. | 702/183 |
| 2006/0011837 A1 * | 1/2006 | Jee et al. | 250/311 |
| 2006/0034536 A1 * | 2/2006 | Ogren et al. | 382/254 |
| 2006/0038828 A1 | 2/2006 | Klassen | |
| 2006/0078167 A1 * | 4/2006 | Heikkila et al. | 382/112 |
| 2006/0209101 A1 * | 9/2006 | Mizes | 347/2 |
| 2007/0236747 A1 * | 10/2007 | Paul | 358/3.26 |

FOREIGN PATENT DOCUMENTS

| | | | |
|---|---|---|---|
| JP | 2005/265639 | * | 9/2005 |
| JP | 2005265639 A | * | 9/2005 |

OTHER PUBLICATIONS

U.S. Appl. No. 10/739,177, filed Dec. 19, 2003, Mizes.
U.S. Appl. No. 10/922,316, filed Aug. 19, 2004, Zhang, et al.
U.S. Appl. No. 10/923,116, filed Aug. 20, 2004, Zhang, et al.

(Continued)

*Primary Examiner*—Matthew C Bella
*Assistant Examiner*—Gregory F Cunningham
(74) *Attorney, Agent, or Firm*—Fay Sharpe LLP

(57) ABSTRACT

A method of detecting image quality defects includes providing an electronic image including electronic image data, rendering an image based on the electronic image data, capturing the rendered image, the captured image including captured image data, deriving one-dimensional profiles from the captured image data, each of the captured one-dimensional profiles being derived from a set of image data in the same direction, optionally, deriving reference one-dimensional profiles from the electronic image data and generating a difference profile from the reference and captured one-dimensional profiles, and evaluating at least one of the captured one-dimensional profiles and reference one-dimensional profiles for image quality defects.

21 Claims, 11 Drawing Sheets

OTHER PUBLICATIONS

U.S. Appl. No. 10/992,726, filed Nov. 22, 2004, Klassen, et al.
U.S. Appl. No. 10/999,326, filed Nov. 30, 2004, Grace, et al.
U.S. Appl. No. 11/070,681, filed Mar. 2, 2005, Viturro, et al.
U.S. Appl. No. 11/084,280, filed Mar. 18, 2005, Mizes
U.S. Appl. No. 11/137,251, filed May 25, 2005, Lofthus, et al.
U.S. Appl. No. 11/143,818, filed Jun. 2, 2005, Delal, et al.
U.S. Appl. No. 11/222,260, filed Sep. 8, 2005, Goodman, et al.
U.S. Appl. No. 11/363,378, filed Feb. 27, 2006, Anderson, et al.
U.S. Appl. No. 11/399,100, filed Apr. 6, 2006, Paul.

* cited by examiner

BANDING AND STREAK DETECTION USING CUSTOMER DOCUMENTS

CROSS REFERENCE TO RELATED PATENTS AND APPLICATIONS

The following references, the disclosures of which are incorporated herein in their entireties by reference, are mentioned:

U.S. application Ser. No. 10/992,726, filed Nov. 22, 2004, entitled SYSTEMS AND METHODS FOR DETECTING IMAGE QUALITY DEFECTS, by R. Victor Klassen, et al.;

U.S. application Ser. No. 10/922,316, Publication No. 2006/0077488, entitled METHOD AND SYSTEMS ACHIEVING PRINT UNIFORMITY USING REDUCED MEMORY OR COMPUTATIONAL REQUIREMENTS, filed Aug. 19, 2004, by Zhang, et al.;

U.S. application Ser. No. 11/143,818, entitled INTER-SEPARATION DECORRELATOR, filed Jun. 2, 2005, by Edul Dalal, et al.;

U.S. application Ser. No. 10/923,116, Publication No. 2006/0077489, entitled UNIFORMITY COMPENSATION IN HALFTONED IMAGES, filed Aug. 20, 2004, by Yequing Zhang, et al.;

U.S. application Ser. No. 10/999,326, filed Nov. 30, 2004, entitled SEMI-AUTOMATIC IMAGE QUALITY ADJUSTMENT FOR MULTIPLE MARKING ENGINE SYSTEMS, by Robert E. Grace, et al.;

U.S. application Ser. No. 11/222,260, filed Sep. 8, 2005, entitled METHODS AND SYSTEMS FOR DETERMINING BANDING COMPENSATION PARAMETERS IN PRINTING SYSTEMS, by Nancy Goodman, et al.;

U.S. application Ser. No. 11/084,280, filed Mar. 18, 2005, entitled SYSTEMS AND METHODS FOR MEASURING UNIFORMITY IN IMAGES, by Howard Mizes;

U.S. application Ser. No. 10/739,177, filed Dec. 19, 2003, entitled SYSTEMS AND METHODS FOR COMPENSATING FOR STREAKS IN IMAGES, Publication No. 2005/0134623, by Howard Mizes;

U.S. application Ser. No. 11/137,251, filed May 25, 2005, entitled SCHEDULING SYSTEM, by Robert M. Lofthus, et al.;

U.S. application Ser. No. 11/070,681, filed Mar. 2, 2005, entitled GRAY BALANCE FOR A PRINTING SYSTEM OF MULTIPLE MARKING ENGINES, by R. Enrique Viturro, et al.;

U.S. application Ser. No. 11/399,100, filed Apr. 6, 2006, entitled "SYSTEMS AND METHODS TO MEASURE BANDING PRINT DEFECTS", by Peter Paul; and U.S. application Ser. No. 11/363,378, filed Feb. 27, 2006, entitled SYSTEM FOR MASKING PRINT DEFECTS, by David G. Anderson, et al.

BACKGROUND

The exemplary embodiment relates generally to systems and methods for detecting image quality defects generated by an imaging device. It finds particular application in the diagnosis of print quality defects in printing systems using original customer documents.

Image non-uniformity occurs in the output images of digital image rendering devices, such as copiers, scanners, and printers, for a variety of reasons. Even relatively small non-uniformities can give rise to visibly objectionable print defects. In printing systems, physical alignments, component tolerances, wear and component age can influence the uniformity with which colorants, such as inks and toners, are laid down across the surface of print media. Streaks, for example, are one-dimensional image defects that generally run parallel to the process direction in the printed image. They can arise from non-uniform responses of the subsystems of an image rendering device, such as a xerographic marking engine, and can be constant over time in that they appear in relatively the same location from print to print. Photoreceptor scratches, contamination of the charging wire(s), non-uniform LED imager output and Raster Output Scanner (ROS) spot size variations, and spatially varying pressure on a bias transfer roll are examples of subsystem defects that can give rise to rendered image streaking in a xerographic marking engine. Bands are also one-dimensional image defects that generally run perpendicular to the process direction in a printed image. They are typically caused by time-varying performance of a marking engine subsystem, such as non-uniform velocity of the photoreceptor drive, out-of-roundness of development rolls, and wobble of the ROS polygon mirror. In a uniform patch of gray, streaks and bands may appear as a variation in the gray level. In general, "gray" refers to the optical density or area coverage value of any single color separation layer, whether the colorant is black, cyan, magenta, yellow, or some other color.

Detection of image quality defects ensures the production of quality images by image rendering devices. There are various approaches for detecting such defects. For example, test images designed to highlight any problems are rendered by an image rendering device, such as a printer, and captured by an image capturing device, such as a camera, a scanner, or the like. The captured images are compared with a standard test page designed to provide information about the performance of the printer. The existence of an artifact or defect in the image can thereby be detected. The customer or service representative uses the documents to diagnose printer problems, but generally only when the customer is already aware of a problem.

Although some image quality defects may not be visible, these defects may indicate that the device is deteriorating, and presage visible image quality defects. Other image quality defects may be largely of a geometric nature and caused by distortion due to slight warping of the rendered image, small misalignment of the captured image, mapping errors between the image capture device and the image rendering device, and other systematic defects of the image rendering devices not related to degradation of the rendering device. Therefore, another approach is to detect the image quality defects early, so the image rendering device may be adjusted or repaired to reduce or even avoid image quality defects. In this second approach, a full difference image between an ideal and a scanned customer document is computed. The difference image is then analyzed for defects.

Various methods exist for correcting image quality defects, once they are detected. These include modification of the tone reproduction curves (TRCs) used in converting the original image data into machine-dependent image data. One-dimensional TRCs are widely used in digital imaging as a means for compensating for non-linearities introduced by an individual imaging device. Other methods include replacing or repairing components of the image rendering system responsible for the image quality defects.

INCORPORATION BY REFERENCE

The following references, the disclosures of which are incorporated herein in their entireties by reference, are mentioned.

U.S. Publication No. 2006/0038828, entitled METHOD FOR CALCULATING COLORANT ERROR FROM REFLECTANCE MEASUREMENT, by R. Victor Klassen, discloses calculation of color error associated with an image rendered by a rendering device in the no more than N−1 dimensions of an associated color sensor color space. A differential of a mapping from an N dimensional rendering device color space to the associated color sensor color space is used to calculate a colorant error in the N dimensions of the rendering device color space. Where necessary, appropriate assumptions are used to constrain an underdetermined system of equations. Where calculated colorant error is unreasonable, the calculated colorant error is clipped and colorant error is recalculated based on the clipped value.

U.S. Pat. No. 6,760,056 to R. Victor Klassen, et al., entitled MACRO UNIFORMITY CORRECTION FOR X-Y SEPARABLE NON-UNIFORMITY discloses a method for compensating for streaks by introducing a separate tone reproduction curve for each pixel column in the process direction. A compensation pattern is printed and then scanned to first measure the ideal tone reproduction curve and then detected and measure streaks. The tone reproduction curves for the pixel columns associated with the streak are then modified to compensate for the streak.

U.S. Pat. No. 6,377,758 to William OuYang, et al., entitled METHOD AND SYSTEM FOR ANALYZING IMAGING PROBLEMS, describes a method and a system for analyzing imaging problems by printing an image, scanning the printed image and comparing the scanned image and the original image on a pixel by pixel basis to detect defects generated by an intermediate imaging member.

Above-mentioned U.S. application Ser. No. 10/992,726 discloses a method of detecting image quality defects which includes obtaining an electronic image including electronic image data, rendering an image based on the electronic image data, capturing the rendered image, the captured image including captured image data, registering the electronic image with the captured image, identifying at least one region of interest in the electronic image, and comparing the electronic image data of the at least one region of interest in the electronic image and the captured image data of a corresponding region to determine a colorant error.

BRIEF DESCRIPTION

In accordance with one aspect of the exemplary embodiment disclosed herein, a method for detecting image quality defects includes providing an electronic image including electronic image data. The method further includes rendering an image based on the electronic image data and capturing the rendered image. The captured image includes captured image data. One-dimensional profiles are derived from the captured image data, each of the captured one-dimensional profiles comprising a set of image data in the same direction. The method optionally includes deriving reference one-dimensional profiles from the electronic image data and generating difference profiles from the reference one-dimensional profiles and captured one-dimensional profiles. At least one of the captured one-dimensional profiles and the difference profiles are evaluated for image quality defects.

In accordance with another aspect of the exemplary embodiment, a system includes memory which stores image data, the image data comprising image data derived from an electronic image and image data derived from a captured image of a rendered image based on the electronic image. The system also includes memory which stores instructions for deriving one-dimensional profiles from the captured image data, each of the captured one-dimensional profiles comprising a set of image data in the same direction, and optionally, instructions for deriving reference one-dimensional profiles from the electronic image data and generating difference profiles from the reference one-dimensional profiles and captured one-dimensional profiles, and evaluating at least one of the captured one-dimensional profiles and reference one-dimensional profiles for image quality defects. A processing device executes the instructions.

In another aspect, a computer readable medium includes instructions for detecting image quality defects. The instructions include instructions for storing captured image data and instructions for deriving one-dimensional profiles from the captured image data. Each of the captured one-dimensional profiles comprises a set of the image data in the same direction. Optionally, the medium includes instructions for deriving reference one-dimensional profiles from electronic image data used as the source for a rendered image from which the captured image data is derived, and instructions for generating differences profile from the reference and captured one-dimensional profiles. The medium further includes instructions for evaluating at least one of the captured one-dimensional profiles and difference profiles for image quality defects.

In another aspect, a method of detecting image quality defects includes providing an electronic image including electronic image data. An image is rendered based on the electronic image data. The rendered image is captured. The captured image includes captured image data. A plurality of one dimensional difference profiles are derived from the captured image data and the electronic image data, each of the one-dimensional difference profiles being derived from a set of captured image data and a corresponding set of electronic image data in the same direction. The difference one-dimensional profiles are evaluated for image quality defects.

DETAILED DESCRIPTION

Figure 1:
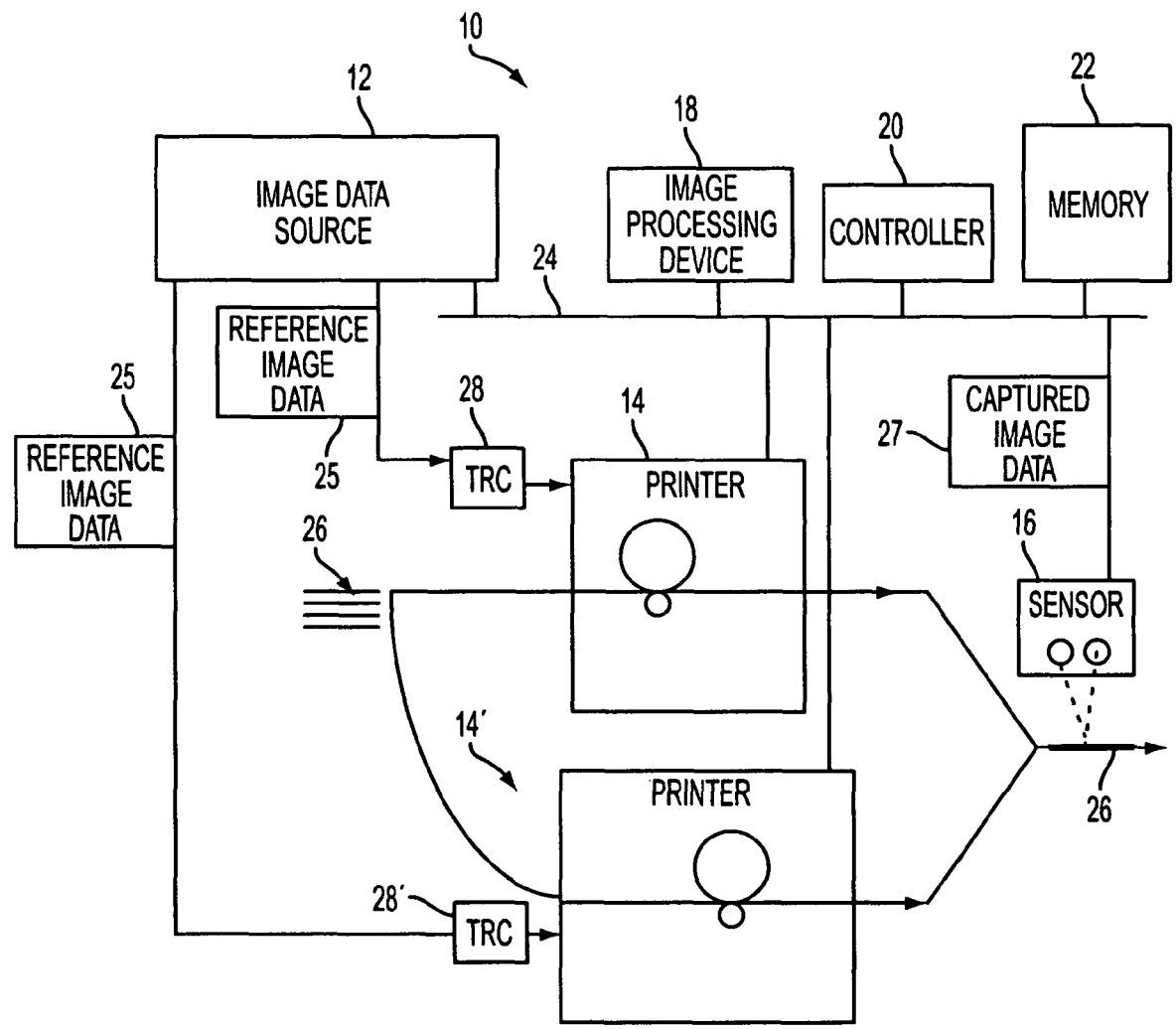
FIG. 1 is a functional block diagram of a system for detecting image quality defects embodied in a printing system in accordance with one aspect of the exemplary embodiment.

In various aspects of the exemplary embodiment, a method of detecting print defects includes providing an electronic image which includes two-dimensional electronic image data. For example, pages of an original document to be rendered which are likely to exhibit print defects if they exist are selected. One or more images are rendered based on the electronic image data with a rendering device, such as a printer. The rendered image(s) are captured with a suitable image capturing device, such as an online or offline scanner. The captured image includes two dimensional captured image data. The image data typically includes gray levels in one or more color separations for pixels of the image. The captured image(s) may be deskewed, using suitable deskewing techniques, such as by comparison of features in the scan, such as edges, with comparable features of the (either full or reduced resolution) electronic image. One-dimensional profiles are derived from the captured image data. The one-dimensional profiles may be derived in a first direction, such as the process (machine) direction, for banding detection and/or in a second, perpendicular direction, such as the cross-process direction, for streak detection. The one dimensional profiles may be obtained, for example, by one-dimensional averaging of the image data for one or more of the color separations in the deskewed and optionally reduced resolution, captured image to reduce a set of data in one direction to a single representative value.

The one-dimensional profiles are analyzed for image defects. The analysis may include a comparison with corresponding one-dimensional profiles computed from the electronic image (reference profiles). The comparison may include determination of a difference profile by subtraction, from the one-dimensional profiles derived from the captured image data, of the corresponding one-dimensional profiles derived from the electronic image (reference profiles) at the same resolution. The subtraction may take place either before or after averaging the data from which the profiles are derived. The analysis for image defects may include identifying periodic variations in the one-dimensional profiles or difference profiles, for example using Fourier transform analysis, as an indicator of banding. Non-periodic variations, such as streaks, may also be identified in the difference profiles.

To identify temporal trends in image defects, data from images captured later in time may be compared with data from the first captured image. In this way, a progressive deterioration in the image defect status of an image rendering device can be determined, generally before the defects become visually apparent to the user. The defects may be masked by changes to operating parameters of the image rendering device, such as modifications to the TRCs utilized by the image rendering device. Alternatively or additionally, sensitive jobs may be directed to image rendering devices which are determined or expected to have a lower defect status at the time of printing.

In other aspects of the exemplary embodiment, a system for detecting print defects and a computer readable medium embodying instructions for performing the exemplary method are disclosed.

The exemplary embodiment is particularly suited to the detection of print defects which are manifest as progressively deteriorating changes from ideal. Such defects may be undetectable initially to the naked eye but ultimately are visible, if the cause of the defect is not corrected or the defect masked. The exemplary method allows customers to be notified, in advance of a defect becoming visible, when a printer is likely to go out of specification, or when it is well within specification, i.e., how close to optimal performance a printer is operating. This permits the customer (or the printing system, acting automatically) to send sensitive print jobs to printers closest to optimal performance and to schedule service for printers heading out of specification. Less sensitive jobs may be sent to those printers which are moving out of specification when printer demand is high, until service is available.

In various aspects, the exemplary method detects where a printer is relative to its image quality specification by examining the images it is producing and detecting print defects.

Print defects detected are primarily one-dimensional print defects, such as banding (marks not in the original image which run perpendicular to the process direction) and streaks (marks not in the original image which run parallel to the process direction). These defects may be periodic, particularly in the case of banding. The defects may be detected using a signal processing algorithm which may be applied to the output of a sensor system. The sensor system may include an inline sensor or an offline sensor. The sensing may be performed on actual customer documents (images selected by the printer user which are rendered on print media by the printer) rather than on test images (images that are specifically designed to highlight defects). In one aspect, the acquired output of the sensor is first de-skewed so that the sets of data used for generating the one-dimensional profiles are generally aligned with the process or cross process direction of the original image. Following deskewing, one-dimensional profiles along process and/or cross-process directions are made for the captured (scanned) image. The algorithm may derive difference profiles by comparing the one-dimensional profiles derived from the sensor output with corresponding profiles from the digital image original (the "reference image"), which may be a low-resolution version of the image original. Frequencies at which there is a higher than usual level of correlation in the one-dimensional profiles or difference profiles are indicative of image defects such as banding or streaking.

With reference to FIG. 1, a functional block diagram of an exemplary system 10 for detection of print quality defects is shown. The system 10 includes an image data source 12, an image rendering device or "printer" 14, an image capturing device or "sensor" 16, an image processing device 18, a controller 20, and a memory 22, all appropriately connected by one or more control and/or data buses 24.

The image data source 12 may be a device such as a computer system, a data storage device, a scanner, a facsimile machine, or any other device capable of providing electronic image data. The image data source 12 is arranged to provide image data 25 of an original image to the image rendering device 14 and the processing device 18. An original image generally may include information in electronic form which is to be rendered on the print media by the printer and may include one or more of text, graphics, photographs, and the like. The image may be a customer image or a test image which is designed for highlighting print defects.

The image rendering device 14 may be a printer or other device capable of rendering an image on a tangible medium or an electronic medium. A printer, as used herein, can include any device for rendering an image on print media 26, such as a copier, laser printer, bookmaking machine, facsimile machine, or a multifunction machine. Print media can be a physical sheet of paper, plastic, or other suitable physical print media substrate for images. A print job or document is normally a set of related sheets, usually one or more collated copy sets copied from a set of original print job sheets or electronic document page images, from a particular user, or otherwise related. The operation of applying images to print media, for example, graphics, text, photographs, etc., is generally referred to herein as printing or marking.

Exemplary printers include xerographic (laser) printers, inkjet printers, thermal printers, combinations thereof, and the like. The printer may render an image on the print media with one or more colorants, such as toners, inks, or the like. For example, four colorants cyan, magenta, yellow, and black (CMYK) may be employed by a color printer in rendering the image or a single colorant, such as black, in a monochrome printer. The original image data provided by the image data source 12 may be in a device independent color space, such as CIE L*,a*,b* in which the L* dimension represents lightness and the hue and chroma are represented by the combination of a*,b* values. The original image data may be converted to device dependent image data, such as CMYK data, prior to rendering, by a suitable conversion algorithm, such as a TRC 28, generally one for each color separation, although multi-dimensional look up tables are also contemplated.

The printer may be a halftone printer in which an input image in digital form is converted to a format in which the image can be rendered. In halftone printing, the pixels of the original electronic image may be expressed as continuous colors or gray levels, such as 256 gray levels on an 8 bit scale. In halftone printing, each color separation is represented by dots or lines. Each dot is contained within a cell made up of a number of elements or spots, usually arranged in a grid. Each spot may be either on or off. Higher gray levels are rendered by having more of the spots switched on. However, in general, fewer gray levels are possible than in the original image, with a group of gray levels being represented by the same cluster of spots. Or, the printer can be a contone (continuous tone) printing system in which each dot can be rendered at many different lightness/darkness levels by varying the amount of colorant applied.

The image capturing device 16 may be a device such as a camera, a scanner, or any device capable of capturing the rendered image in electronic form. The image capturing device 16 is arranged to provide image data 27 of the captured image to the processing device 18. The image capturing device may employ color sensors which are based on the three primary colors (i.e.; red, green, and blue). Light reflected from an image or object is filtered or refracted according to its wavelength. Light sensors such as photo diodes and photo transistors or charge coupled devices are positioned to receive the filtered or refracted light. The sensors generate signals according to the intensity of the light that reaches them. Some sensors report these color signals in terms of red, green and blue intensities. Other sensors include processing elements for converting the received intensities into values in a device independent color space, such as L*, a*, b*. In either case, these color sensors report color measurements in three dimensions (e.g., R, G, B or L*, a*, b*). The captured image data and/or original image data may be converted to a common color space for image defect detection. For example, the original image L*, a*, b* data may be converted to R, G, B values or the sensor R, G, B data may be converted to L*, a*, b* values.

The processing device 18 may be a device such as a computer system, a processor, or other device capable of manipulating and/or analyzing image data. The processing device 18 receives the original image data from the image data source 12 and the captured data from the image capturing device 18.

The processing device 18 executes instructions for performing the method of detecting defects, illustrated in FIG. 2, and described in further detail below. In general, these instructions include instructions for retrieving a captured image, de-skewing the captured image, determining one-dimensional profiles, optionally comparing the one dimension profiles with reference profiles derived from the original image, identifying from the profiles, evidence of image defects, such as evidence of periodic nature of the image, and identifying those frequencies which have high correlations which are likely to indicate banding. The instructions may be stored in an associated memory, such as memory 22, or in a separate memory. The processing device 18 may determine a defect state of the image rendering device, such as an extent to which the device is within or outside its optimal operating range. The processing device 18 may also determine a likely cause of the defect state and select a solution, implement the selected solution, or otherwise evaluate the image rendering device 14.

The memory 22 may store original images to be rendered by the image rendering device 14 and scanned images. The memory may also store image data which has been processed by the processor 18, as well as data derived from the images to be used in the error determination, and/or determined defect states of the printer. The memory 22 may also store instructions for operation of the image processing device 18. Further, the memory may store one or more algorithms 28 for modifying the original image data to correct images whereby the one-dimensional defects in the rendered images are reduced. Such algorithms are generally referred to herein as spatial tone reproduction curves (TRCs). The memory may be implemented using any appropriate combination of alterable, volatile or non-volatile memory or non-alterable, or fixed, memory. The alterable memory, whether volatile or non-volatile, can be implemented by using any one or more of static or dynamic RAM, a floppy disk and disk drive, a writeable or rewriteable optical disk and disk drive, a hard drive, flash memory or the like. Similarly, the non-alterable or fixed memory can be implemented using any one or more of ROM, PROM, EPROM, EEPROM, and gaps in optical ROM disk, such as a CD ROM or DVD ROM disk and disk drive, or the like.

The controller 20 may be any suitable control system for controlling the operation of the other components so as to achieve the defect detection and defect state determination. The controller 20 may also control the operation of the image rendering device 14, schedule print jobs for printing, and other functions of a printing system. While a separate controller and processor are described, the functions of these two components may be performed by a single processor As shown in FIG. 1, the system 10 may include one or more additional image rendering devices 14', which may function analogously to image rendering device 14. In this way, the controller 20 may select the image rendering device 14, 14' which is performing closest to its optimal performance (lowest defect state) as determined by the processor 18 for subsequent rendering images from the image data source 12.

Figure 2:
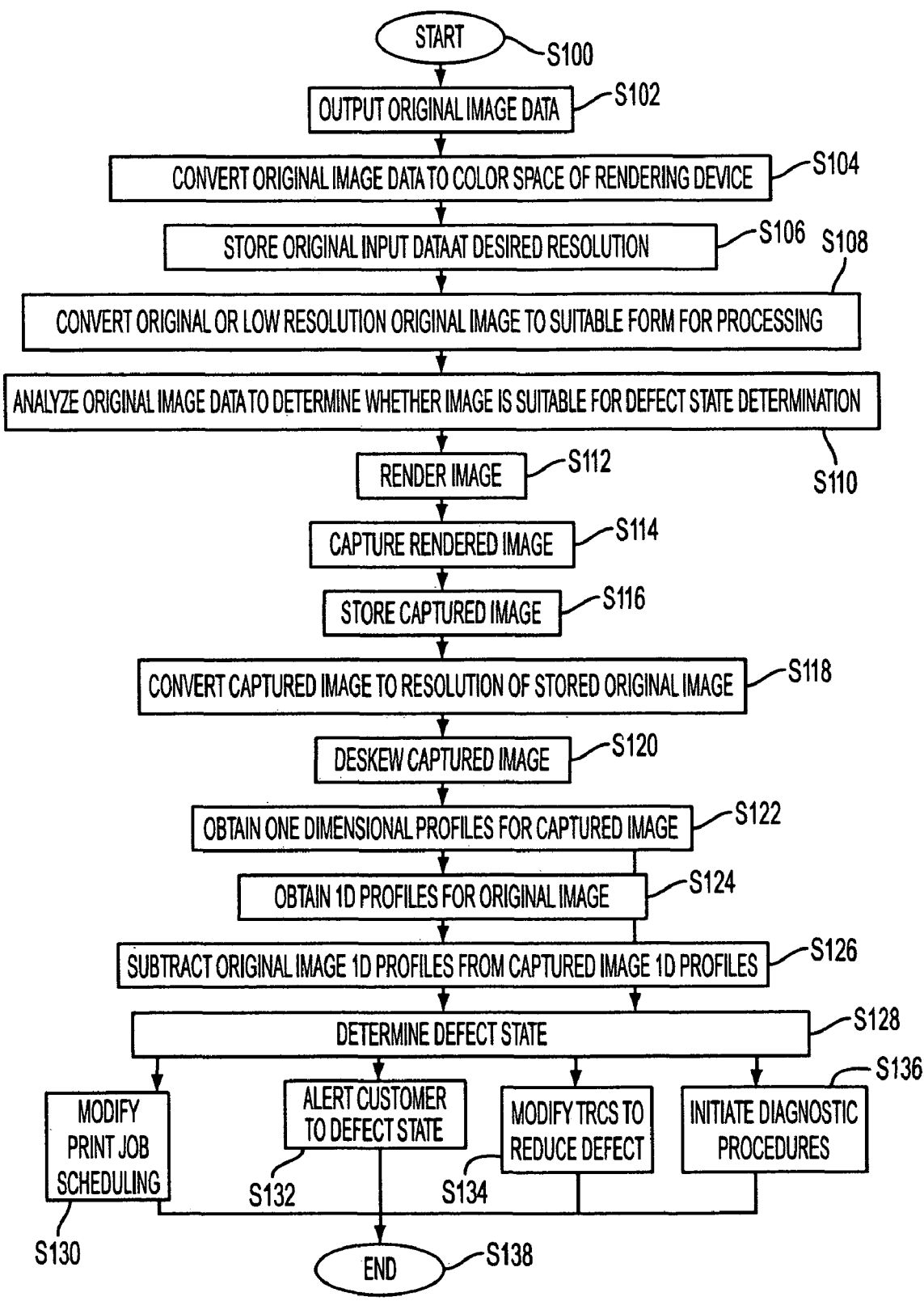
FIG. 2 is a flow diagram of an exemplary method for detection and optionally for correction of image quality defects.

The exemplary system 10 for determining image defects in the rendering device according to FIG. 1 may operate in the manner illustrated in the flowchart of FIG. 2. It will be appreciated that the method may include fewer, more, or different steps than those illustrated in FIG. 2, and that the order of steps may differ from that shown. Additionally, while the method is described as being performed by particular components of the system 10, some of the components may be combined or split into two or more components.

In one exemplary method (method A), captured one-dimensional profiles (1DPs) are obtained for the captured images and reference 1DPs are obtained for original images. The captured and reference 1DPs are compared, e.g., by subtraction, and the results of the comparison used in identifying defects. Specifically, the reference 1DPs may be generated along the same direction as the captured 1DPs from the modified-resolution original (reference) image. Then the pair of profiles (captured and reference) is processed to align the resolution, align the position, and compute the difference. This difference profile may then used for banding detection when computed in the process direction and streak detection, when computed in the cross-process direction. In another exemplary method (method B), the defects are identified from the captured images without comparison with the reference 1DP's. Thus, several of the steps described below may be omitted in method B, as indicated.

The method begins at step S100. Original image data 25 is output from the original data source 12 (step S102). The original input image data 25 may be converted to a device dependent color space of the image rendering device 14, such as three or more color separations (e.g., cyan, magenta, yellow, and optionally black) corresponding to colorants, e.g., inks or toners, used by the image rendering device (step S104). The controller 20 may store the original image data in the memory 22 at a desirable resolution (which may be higher or lower than the original) for detection of defects (step S106) (this step may be omitted for method B). The modified resolution may be any resolution that matches the resolution of the captured image so that the scanned images and the original images may be directly compared. However, if the resolutions are different, the data of either the scanned image or the original image may be interpolated to generate data having the same resolution as the other. If the resolution is too low, an insufficient number of profiles are generated for detection of high frequency banding. In general, the resolution may be in the range of about 75 dpi (dots per inch) or higher, which can detect a banding with a frequency that is up to 3 cycles/mm or higher. A reduced resolution of about 75 dots/lines per inch, for example, may be suitable when the frequency of banding is not too high.

The original input data 25 (or low resolution original image data), may be converted to a form that is recognized by image processing algorithms stored in the memory 22 (step S108) (may be omitted for method B). At step S110, the controller optionally instructs the processing device 18 to analyze the image to determine whether it is suitable for detection of defects. This step may be performed at an earlier stage if the processing capability exists. Step S110 may include selecting pages, based on original or reduced resolution versions of their electronic originals, which are likely to exhibit print defects if they exist: pages containing only white paper, fine text, or other high frequency image content may be excluded, while pages containing at least some low frequency non-white content over a significant area are selected. Images which are unsuitable, for example, because the coverage on the page is less than a predetermined value, there are insufficient distinct features for registration, one or more color separations are outside a predetermined range, or the like, can be eliminated from further consideration. As will be appreciated, since the defects are repetitive, it is not necessary for every rendered image of every print job to be analyzed for print defects. Rather, a representative image can be selected periodically. Additionally, less than an entire image can be used. Accordingly, the analysis step helps to identify images or portions of images in which print defects, to the extent they exist, are more likely to be detected. Several pages of a print job may be analyzed and the results compounded to provide a composite of print defects and/or to eliminate from consideration, false defects. For short print jobs, the defect state need not be determined for every print job. For lengthy print jobs the defect state may be determined more than once during the print job and may be determined for each of the image rendering devices being used in executing the print job.

In one embodiment, step S110 is omitted. The exemplary method is capable of detecting defects over a broad range of images, unlike prior methods, thus in general, almost all imaged pages are suitable for the present method.

The controller 20 sends the converted input data in the color space to a selected image rendering device 14 (or 14') which renders the converted original image data in a tangible medium 26 or an electronic medium (step S112). The image capturing device 16 captures the rendered image (step S114). The controller 20 then stores the captured rendered image 27 including rendered image data in the memory 22 (step S116). The controller 20 then provides the captured image data 27 in the memory 22 to the processing device 18. The processing device may reduce the resolution of the image, for example, by averaging groups of adjacent pixels, or artificially increase the resolution, for example by interpolation (step S118) (may be omitted in method B). The resolution of the reduced resolution captured image may be selected so that the processing device 18 may process the captured image data at a resolution corresponding to the resolution of the stored converted original image data. The controller 20 may input the reduced resolution captured image into the memory 22 for storage. The captured image may be de-skewed by the processing device (step S120) either before or after reducing the resolution. At step S122, the processing device generates 1DPs for the (optionally de-skewed and reduced resolution) captured image from sets of data which are aligned in the same direction. At step S124, similar 1DPs may be generated for the original (optionally reduced resolution) image, at the same resolution and in the same direction as for the captured image. At step S126, one-dimensional difference profiles are generated by aligning each captured 1PD (derived from the captured image) with a corresponding one of the reference 1DPs (derived from the original image), and subtracting the reference 1DPs from the corresponding captured image 1DPs (steps S124 and S126 are omitted in method B). Alternatively, subtraction of the one dimensional profiles involves aligning the reference data and corresponding captured image data as data pairs and for each data pair, subtracting the reference data from the captured data to provide a set of difference data values. The set of difference data values is then used to generate a one dimensional difference profile, for example, by averaging the difference data values.

At step S128, the 1DPs generated in step S122 (method B) or difference 1DPs obtained in step S126 (method A) are analyzed for periodic behavior indicative of image defects. The processing device may determine a defect state of the printer 14, 14' based on the analysis.

If the processing device 18 determines that a defect state exists which is outside a selected operating range, the controller 20 may initiate one or more defect reducing measures. Such measures may include one or more of: modifying scheduling of print jobs to redirect sensitive print jobs to a printer which is within or closer to the selected operating range (step S130), notifying the customer (e.g., via a display or audible alarm) (step S132), and modifying the stored TRCs to reduce the defect in subsequently rendered images (step S134). Other defect reducing measures may include determining a cause of the defect using appropriate diagnostic techniques (S136). The method ends step S138 (or returns automatically to step S106 after a predetermined interval, such as a preselected time interval or number of pages).

Where an offline image capture device 16 is employed, the selection of images to be used for comparison, capturing of the images, and the storing the captured images may include some manual participation. Otherwise, the entire process may be fully automated.

Step S110 may include one or more of the following substeps: (1) A determination is made whether an amount of coverage of the current page is greater than a predetermined threshold value. Only pages that have at least a minimum amount of coverage are identified for subsequent analysis. (2) A determination is made whether the current page has enough distinct features for registration. Only pages that are capable of being registered are identified for subsequent analysis. (3) A determination is made whether an amount of content of the current page is within a predetermined range in at least one color separation. Only pages that contain some content, neither indicative of white paper nor full toner coverage, are identified for subsequent analysis.

Where the scanner 16 is provided as an internal component of the rendering device 14, e.g., a printer, all pages of the original electronic image may be scanned, and the selection of pages (step S110) may proceed automatically. Where the scanner is provided externally of the printer, an operator may decide to skip the scan of particular pages by manually discarding pages that do not contain suitable features in which banding may be detected.

Various methods for de-skewing (step S120), and optionally dewarping the scanned image exist. De-skewing methods are described, for example, in above-mentioned copending application U.S. Ser. No. 10/992,726 (hereinafter "Klassen"), which is incorporated by reference. De-skewing tends to improve the capabilities for detection of image quality defects, although a certain amount of image skew (such as about 1° or 0.5° or less from true) may be accommodated and still yield satisfactory results. For example, de-skewing may be performed by comparing features of the captured image (such as high contrast regions, e.g., edges) with corresponding features of the low-resolution original image.

Figure 3:
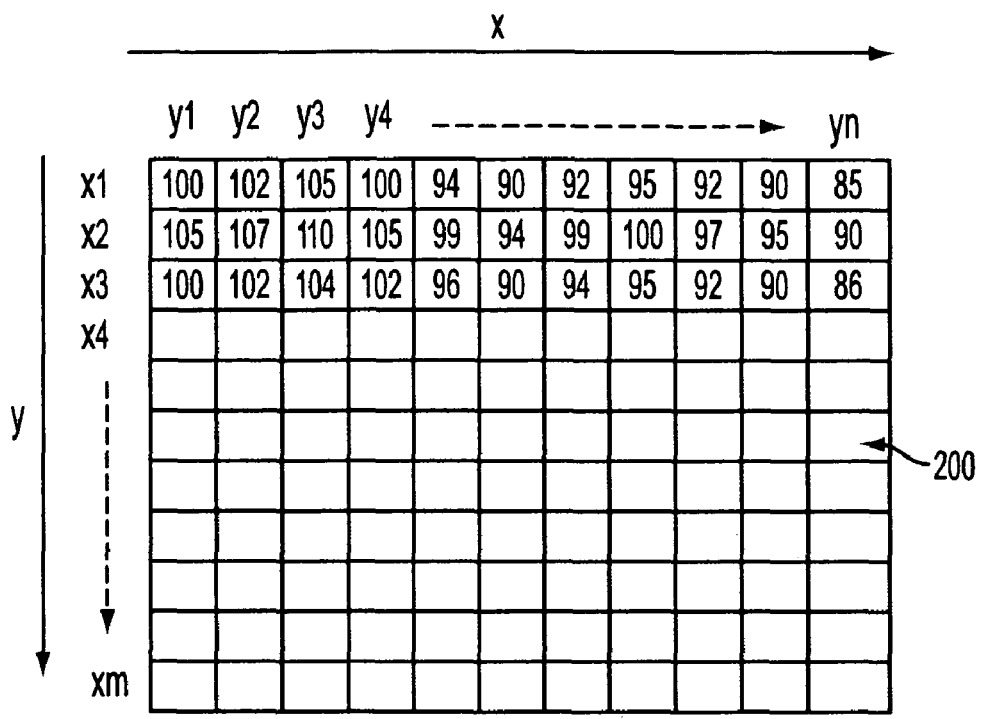
FIG. 3 is a schematic illustration of image data which may be utilized for generation of one-dimensional profiles.
Figure 4:
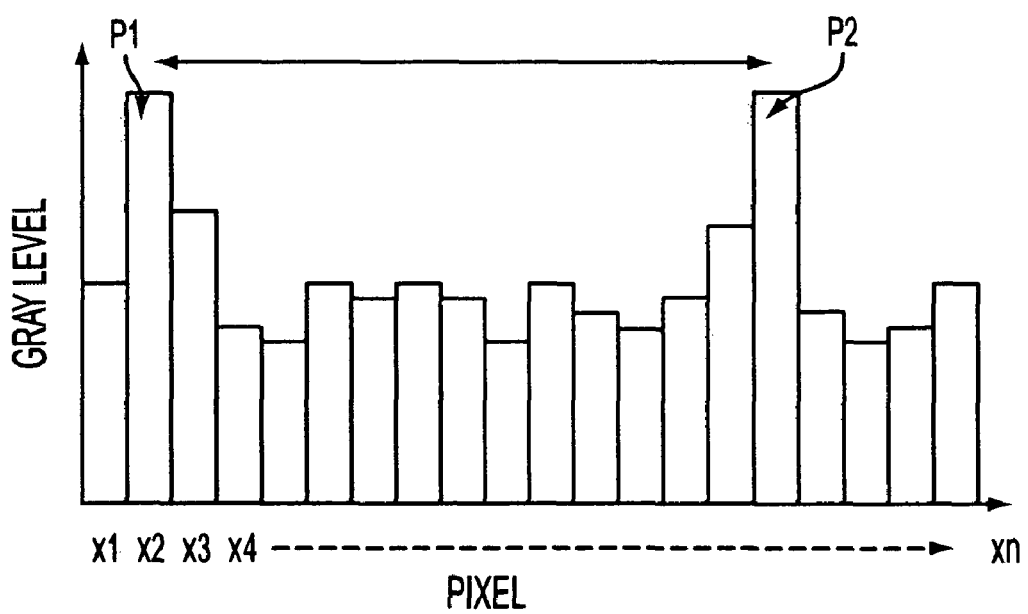
FIG. 4 is a simulated schematic plot of one-dimensional profile averages in the process direction in a portion of the captured image of FIG. 3.

As illustrated in FIG. 3, a de-skewed captured image may include gray level values for a plurality of x,y pixel locations, where x represents the process direction and y represents the cross-process direction. A one-dimensional profile value in the x direction may be obtained as a function (e.g., average) of all the values (e.g., gray levels) in the same line across the image (e.g., by obtaining a mean or median value). Thus a first 1DP value is obtained as an average of the values at $(x_1,y_1)$, $(x_1,y_2)$, $(x_1,y_3)$, $(x_1,y_4)$, ... $(x_1,y_n)$ a second 1DP value is obtained as an average of the values at $(x_2,y_1)$, $(x_2,y_2)$, $(x_2,y_3)$, $(x_2,y_4)$ ... $(x_2,y_n)$, and so forth for increments of x up to $x_m$, as illustrated in FIG. 3. The number n of pixels which are averaged to obtain each 1DP can be up to the total number of pixels in a scan line (at the resolution selected). However, n may be fewer than the maximum, e.g., at least 20 or at least 50 or at least 100 pixels. The pixels averaged may be consecutively located in the scan line or may be spaced. Similarly, m may be fewer than all scan lines.

Where periodic banding is present as an image defect, periodically, the 1DPs (averages) will correlate strongly with each other, such as at P1 and P2. Similar profiles may be generated in the y direction for determination of streaks, although streaks generally do not exhibit periodicity.

The profiles may be generated for each color separation, such as for each of R, G, and B or C, M, Y, and K.

Since there may be a natural periodicity in the original image (such as lines or lines of text across the page at regular intervals), this periodicity will be apparent in the captured image and may be detected as an image defect. This tends to be more significant in the banding (cross process) direction, particularly in text images, where lines of text are equally spaced, with substantially white regions in between.

By subtracting the original image 1DPs from the corresponding captured image 1DPs (step S126, method A), to generate a difference profile, such natural correlations can be removed from consideration. In method A, the generation of difference profiles may include aligning the 1DP data sets from the captured and original images. Prior to alignment, the 1DPs may be brought to the same resolution by up-sampling or down-sampling one or both sets of data. The selected resolution may depend, in part, on the resolution requirements for defect detection and/or computational efficiency requirements. The original image and captured image 1DPs are then aligned along the process direction (in the case of banding) using techniques such as maximizing the correlation, aligning to edges or the like. Such techniques are described, for example, in Klassen, et al., incorporated by reference. Once the profile data sets are aligned, each value in the original image 1DP data set is subtracted from the corresponding value in the captured image profile (or vice versa) to obtain a difference profile set comprising a set of difference values. The difference values may then be averaged to provide a single difference profile value (or some other function representative of the individual values is obtained). Banding (or streaking) may be evident from periodic correlations in the difference profile averages. Banding or streaking may also be evident by difference profile averages which are higher, by a statistically significant amount, than for the neighboring profiles since the image defect results in a larger variation between the captured and the reference profile than normal. Due to rendering, capturing, and processing, there will generally be some variations between the captured and original image profiles, although in general the difference profile averages are lower than when a defect occurs.

For example, assume the averaged captured image profiles and the corresponding averaged reference profiles have difference profile values (averages) of 0, 3.2, 5.0, 4.3, 1.7, −1.7, 4.3, −5.0, −3.2, 0, etc., this suggests that a banding of about +5 in gray level with a periodicity of 10 pixels per cycle has been superimposed on the original image in the rendering process. Alternatively, the 1DP data sets may be averaged before computing the difference.

Where the original image data and captured image data are in different color spaces, the 1DPs of one or both may be converted so that the 1DPs are in the same color space (step S104). For example, in the case of RGB data obtained by the sensor 16, 1DPs may be generated for each of R, G, and B. The three profiles may be converted to profiles in L*,a*,b* color space using a suitable algorithm, such as a look up table. The L*,a*,b* profiles may then be aligned with the corresponding L*,a*,b* profiles for the original image. Alternatively, the pixel values in each 1DP may averaged and then converted to L*,a*,b* values for comparison with average L*,a*,b* values for the corresponding original image profiles.

In another embodiment, the original image and/or captured image profiles are converted to a four dimensional color space, such as a device dependent color space (e.g., CMYK) to obtain four profiles for each scan line. The cyan 1DP for the original image may then be subtracted for the corresponding cyan 1DP for the captured image, and so forth to provide information for each color separation. Methods for converting from one color space to a color space with a greater number of dimensions may employ the method described in above-mentioned U.S. Publication No. 2006/0038828 to Klassen, et al., in order to minimize errors in the conversion. For example, in the case of a color printer and color scan, the method may be used to convert from differences in sensor color space to differences in printer color space.

In an alternate or additional embodiment, to minimize the likelihood that natural periodic correlations (such as white or black lines) within one image will be treated as image defects, several images may be analyzed to eliminate from consideration the periodic correlations which do not occur in all images.

Figure 9:
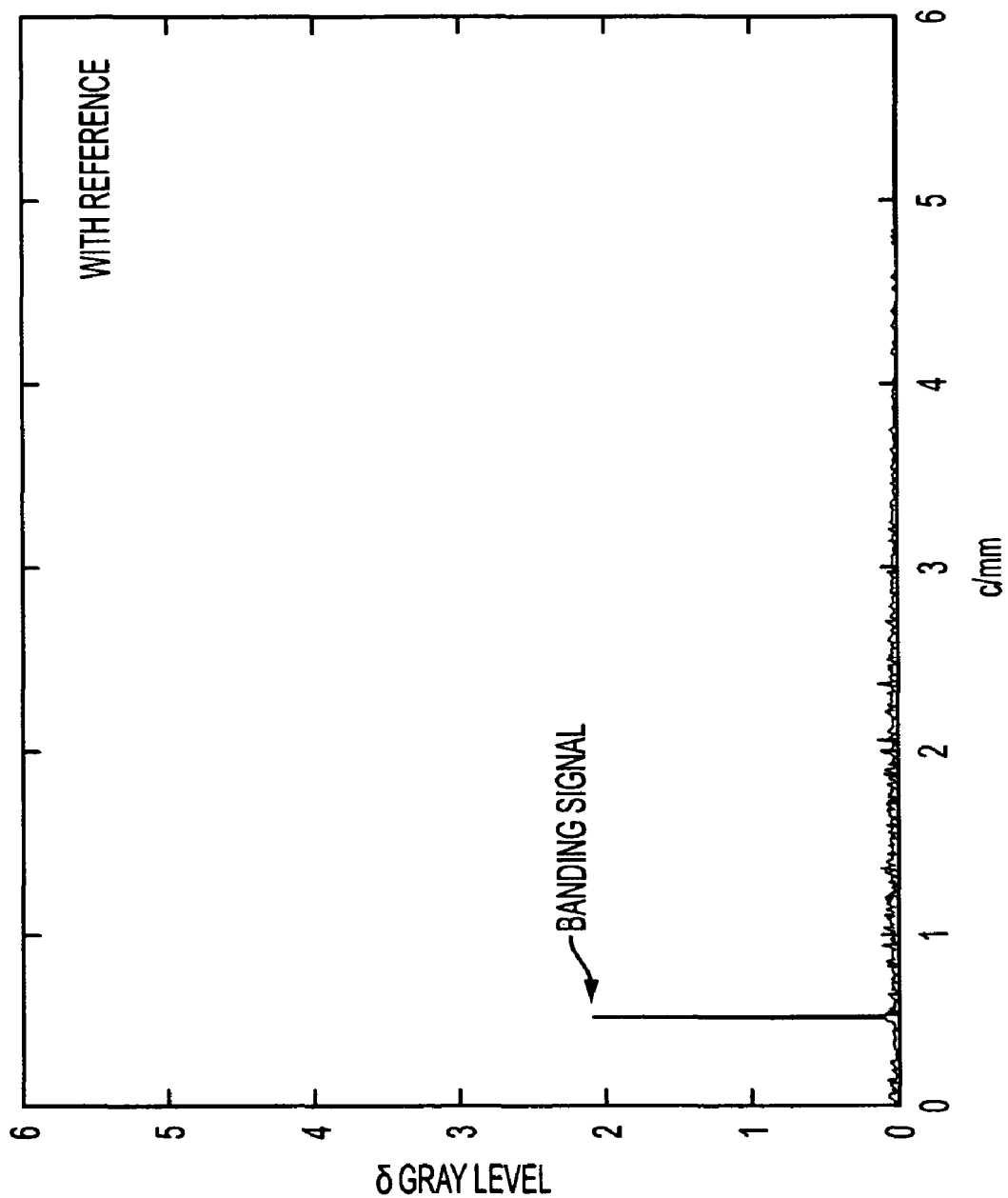
FIG. 9 illustrates an amplitude spectrum of the average one-dimensional difference profiles in the process direction shown in FIG. 7, demonstrating banding detection.
Figure 10:
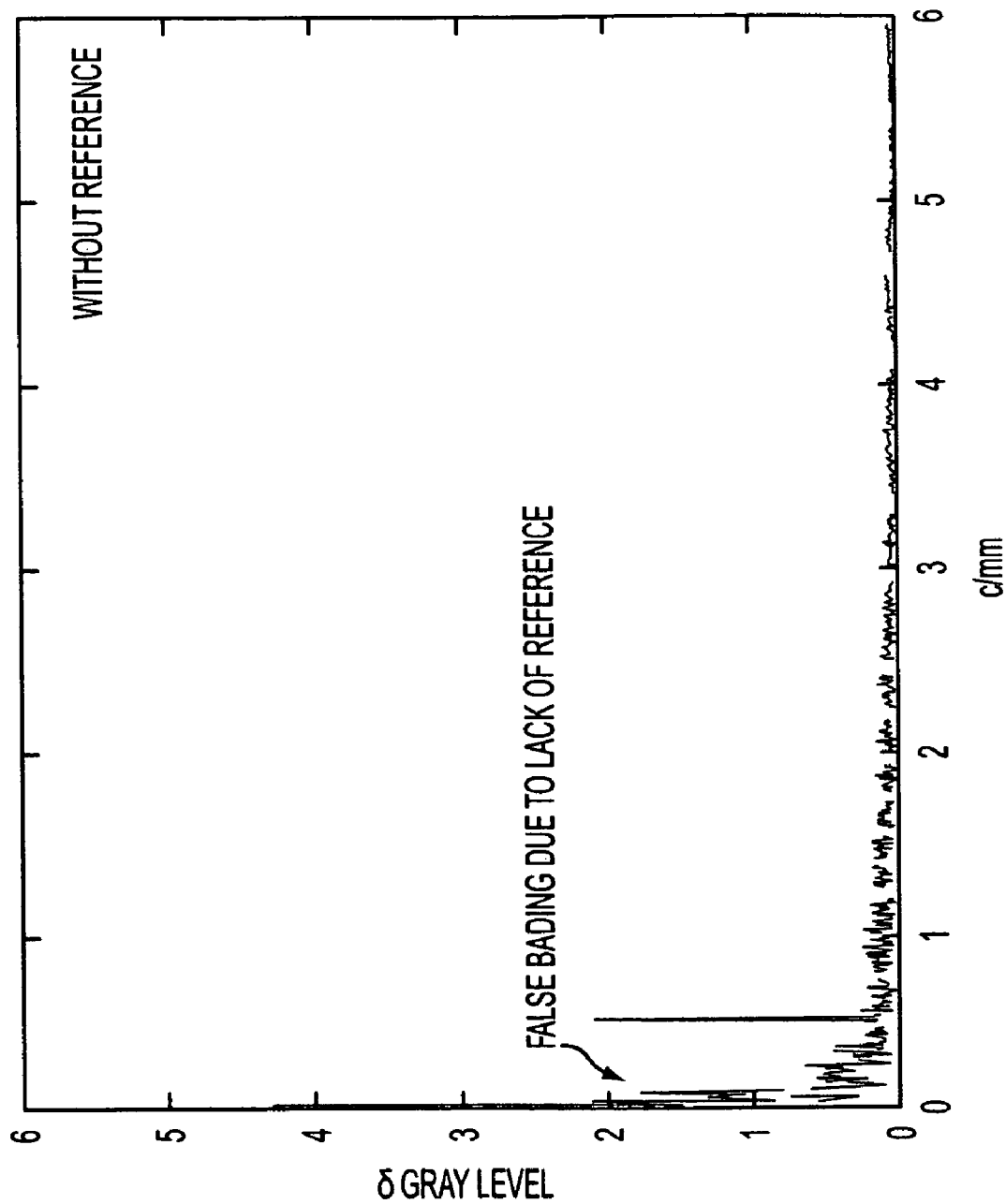
FIG. 10 illustrates an amplitude spectrum of the one-dimensional scan profiles in the process direction from FIG. 5 demonstrating banding detection without use of reference profiles.

In the case of banding, the frequencies at which correlation is more pronounced can be identified by a suitable autocorrelation method (or Fast Fourier Transform method) to obtain a correlation frequency plot of the type shown in FIGS. 9 and 10. Here, the correlating frequencies (in cycles/millimeter, c/mm) are evidenced by peaks. A peak is evident at about 0.5 c/mm, corresponding to a periodic banding every 2 mm. Some of the peaks may correspond to "false banding," particularly those which occur at low frequencies. This is often due to insufficient data (e.g., those peaks occurring below about 0.3 c/mm) (FIG. 10) and/or the frequency content of the customer images. These false bands can be removed from consideration using the subtraction method (method A) as shown in the plot "with reference," (FIG. 9) where the original image data has been subtracted. Alternatively, or additionally, only bands within a specific frequency range or ranges are considered as evidence of banding (such as those which occur at a frequency of 0.3-4 c/mm). This also may help to eliminate false banding which may occur at higher frequencies, corresponding to the screen size in halftone images. It should be noted, however, that the frequency of interest for banding detection is generally lower than the common halftone frequencies, even if they are unknown.

In the illustrated embodiment, subtraction is performed on the 1DPs to obtain difference profiles. However, in an alternate embodiment, a correlation frequency plot derived for the original image is subtracted from the corresponding plot for the captured image to obtain a difference correlation frequency plot.

In the case of streak detection, the 1DP data sets from the original image and captured image are aligned along the cross-processing direction, for example, by finding edges as the reference points for de-skewing. The difference profiles for streak detection may then be calculated. Streak detection is performed on the cross-process-direction difference profile.

For a given printer, there is often a list of frequencies of interest (FOI). These are generally frequencies where banding is expected to occur, based on prior experience with the printer. In such a case, the processing device may focus specifically on these frequencies. For example, a running record of the amplitude spectrum of the process-direction difference profile at the FOI may be maintained. The banding detection may then be performed by examining the temporal trend of the running record. Such a method may improve the reliability of the banding detection and may focus on the banding frequencies with known root-causes. In one embodiment, for a given known banding frequency, an autocorrelation function tuned to the banding frequency can be effectively used to determine the amplitude at that frequency.

In one embodiment, a method is employed which avoids the need to correct for skew. This method provides a robust high-frequency banding detection which is largely independent of skew for detecting high frequency banding. Rather than using the entire image (width of a page) and its reference, as in the method described above, segments of the captured image and the corresponding segments of the low-resolution reference are used to obtain multiple process-direction difference profiles for the high frequency banding detection. The results from each segment are then combined, such as by averaging or taking the 95 percentile, or the like. This provides a method which is more robust against skew because the width of a profile is relatively narrow. Each profile tends to be noisier due to the shorter integration available. However, banding detection is generally much more robust against random noise than it is against skew. Hence the method is generally effective, even when skew is significant.

In one aspect of the exemplary embodiment, instructions to be executed by the processing device may be implemented in a computer program product that may be executed on a computer. The computer program product may be a computer-readable recording medium on which a control program is recorded, or may be a transmittable carrier wave in which the control program is embodied as a data signal.

Without intending to limit the scope of the exemplary embodiment, the following examples demonstrate the effectiveness of the exemplary defect detection system.

EXAMPLES

The following examples were simulations which demonstrate how the system may be used for banding and streak detection in contone and halftone systems.

Example 1

Nominal Contone (8-Bit) Banding Simulation

Figure 5:
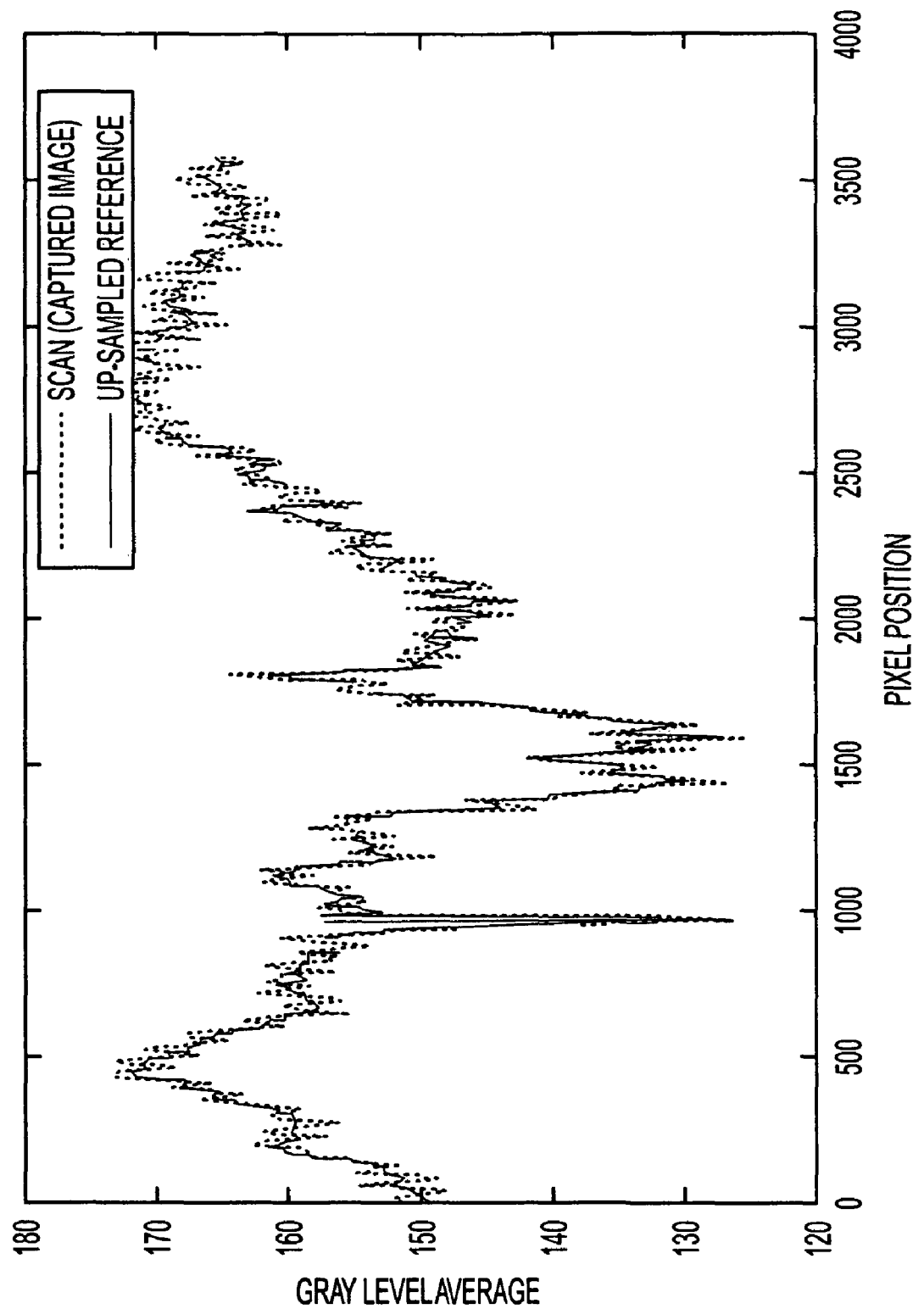
FIG. 5 is a plot of one-dimensional profile averages in the process direction for a simulated captured image and for a reference image at the same resolution.
Figure 6:
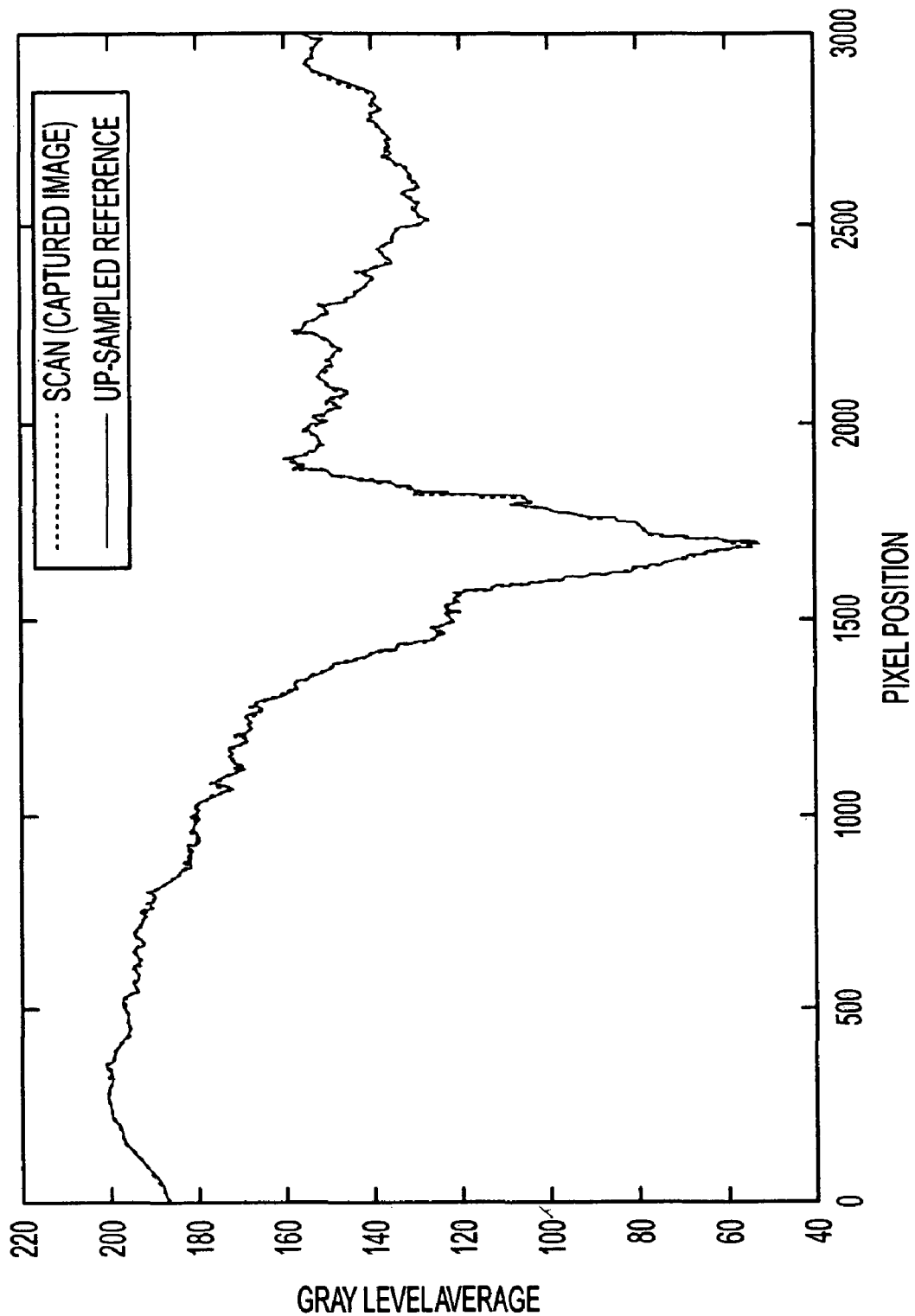
FIG. 6 is a plot of one-dimensional profile averages in the cross-process direction derived for a simulated captured image and for a reference image at the same resolution.

To simulate the operation of the exemplary algorithm, a black and white photographic image (full-resolution image) was down-sampled by 8× in both process and cross process directions to generate a low-resolution reference image. A banding of 2 gray-level amplitude (e.g., for a gray level in the original of 240 on a 0-255 scale, the band would be evidenced by a periodic variation of gray levels between 238 and 242 at a fixed period) was then added to the full-resolution image at a frequency of 0.5 cycles/mm, to simulate a captured image of a print with banding. The banding was repeated every 2 mm. FIGS. 5 and 6 show the corresponding profiles from the "scan" (captured image) and the reference image (up-sampled by 8× to increase the resolution to that of the captured image data) in the process and cross process directions, respectively. In this example, there was no skew incorporated into the simulated print.

Figure 7:
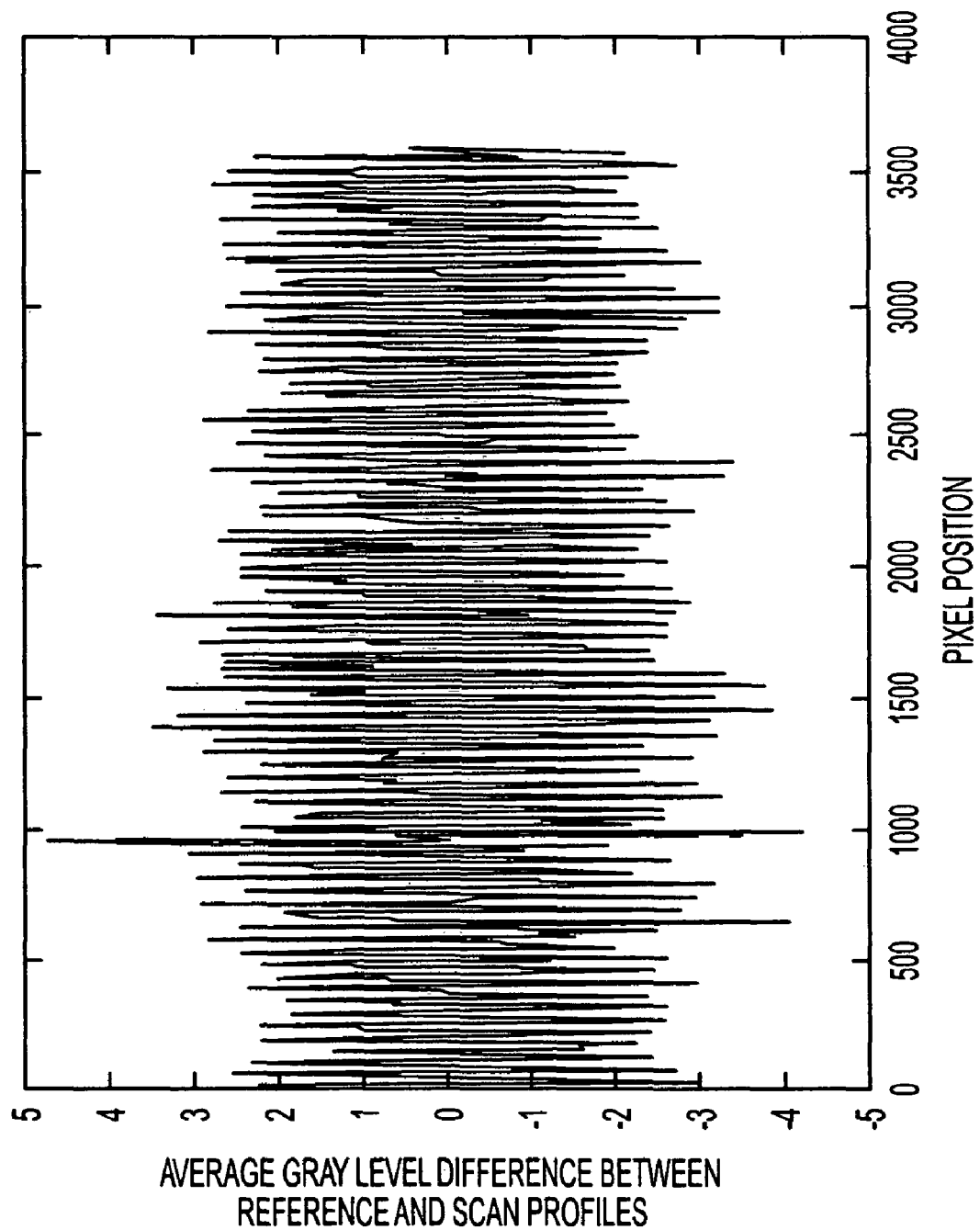
FIGS. 7 and 8 show averages of difference profiles in process and cross-processing direction, respectively, generated by subtraction of the reference profiles from the corresponding scan profiles of FIG. 5.
Figure 8:
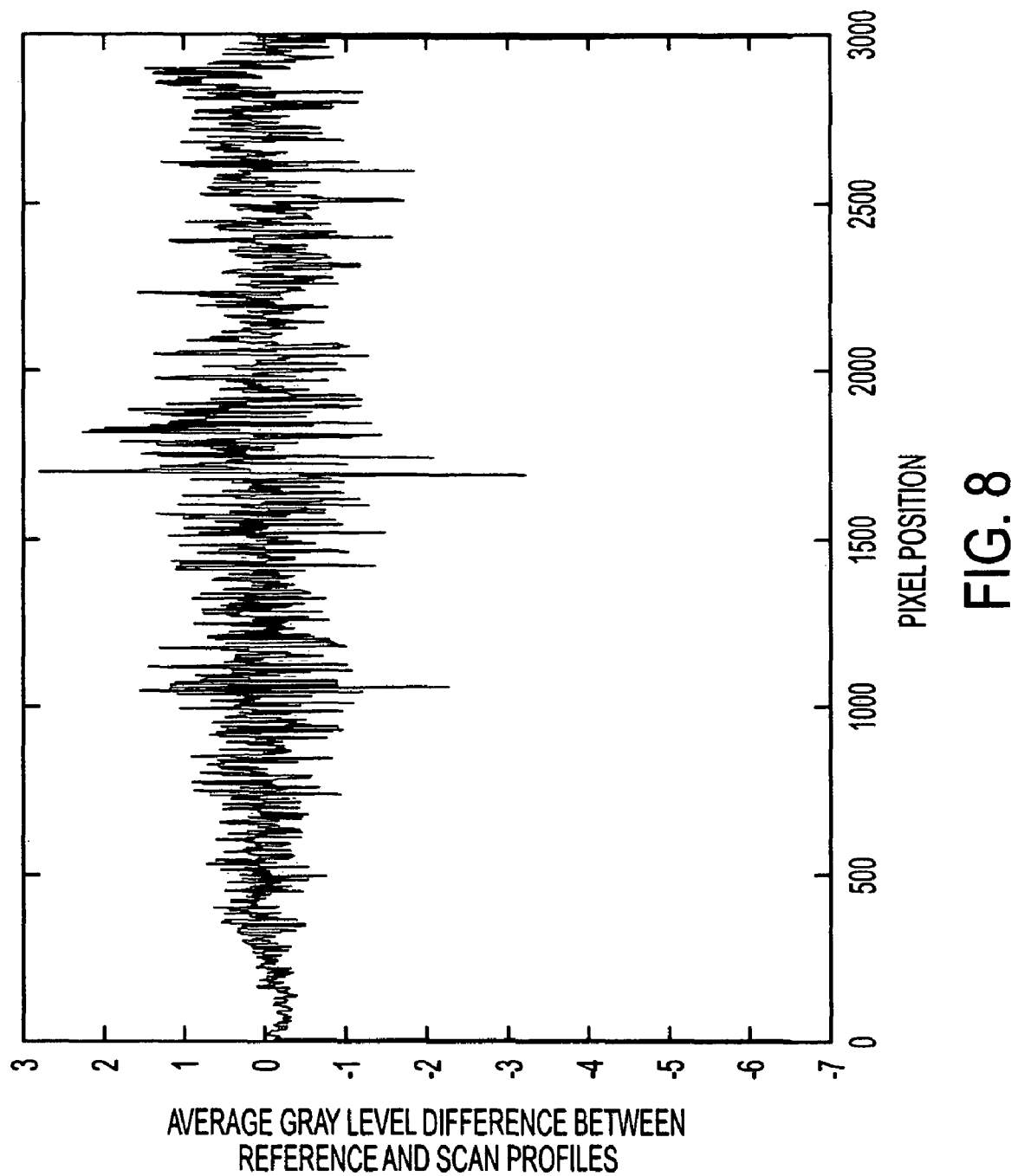

FIGS. 7 and 8 show the difference profiles in process and cross-processing direction, respectively, generated by subtracting the reference profiles from the scan profiles at the same resolution. FIG. 9 shows the amplitude spectrum of the difference profile of FIG. 7 (process direction), as determined by FFT. A spike in amplitude is clearly seen at 0.5 c/mm, corresponding to the banding introduced to the simulated print. This indicates that banding can be easily detected by simple peak detection on this amplitude spectrum. The use of a low-resolution reference helped to reduce banding detection from false positives at low frequencies. The simulation also shows that even without the reference, detection of banding is possible, for example, if the banding frequency is known and/or not at a very low frequency (see FIG. 10). Similar plots were obtained for the cross process direction (not shown).

Further images were tested in the same manner with similar results being obtained.

Example 2

Nominal Simulations on Halftoned Image

To illustrate the effectiveness of the exemplary algorithm on halftoned images, a similar simulation was performed to that described in Example 1, except that the contone image was replaced by a simulated scan of a halftone image, and the simulated banded image with a halftone image with Gaussian blur at a banding frequency of 0.5 c/mm. Plots similar to FIGS. 9 and 10 were obtained which clearly showed the banding peak in the amplitude spectrum of the difference profiles as well as in the analogous spectrum of the scan profiles alone, although less clearly. In this example, for the banding application, a peak was observed at around 3 c/mm due to the halftone screen. There was no need to de-screen the one-dimensional profiles since banding detection around the region of halftone frequency is assumed to be known. From the results, it could be seen that with the use of the reference image, it is possible to detect the desired banding signal, even with the presence of halftone screen. False detection of low-frequency banding, which may occur with a reference-less approach, is substantially eliminated.

Example 3

Simulation on Noisy Halftone Image

A third simulation was performed analogous to that of Example 2, except that blue-noise was added to the simulated print to simulate the effect of graininess of the print to evaluate the banding detection algorithm in the presence of such interference. Due to the excessive graininess, the banding was not visually apparent in the "scan" image. However, in the amplitude spectrum of the difference profiles, the simulated banding at 0.5 c/mm could still be detected, although its amplitude was reduced from 2 (in the noise-free spectrum of FIG. 9) to 1.5 (with noise) due to the noise.

Example 4

Simulation of the Impact of Skew on Banding Detection

A simulation was performed as for Example 2, except in that the rotations in the simulated scan were added to mimic the impact of skew due to image acquisition or print distortion. In this example, skew angles $\theta$ of 0°, 0.25°, 0.5°, 0.75°, and 1.0° were used. The simulation is intended to illustrate the latitude if the de-skew operation is not perfectly performed (normally, in the exemplary algorithm, de-skew would be performed based on two dimensional image processing by the algorithm, as described above).

Figure 11:
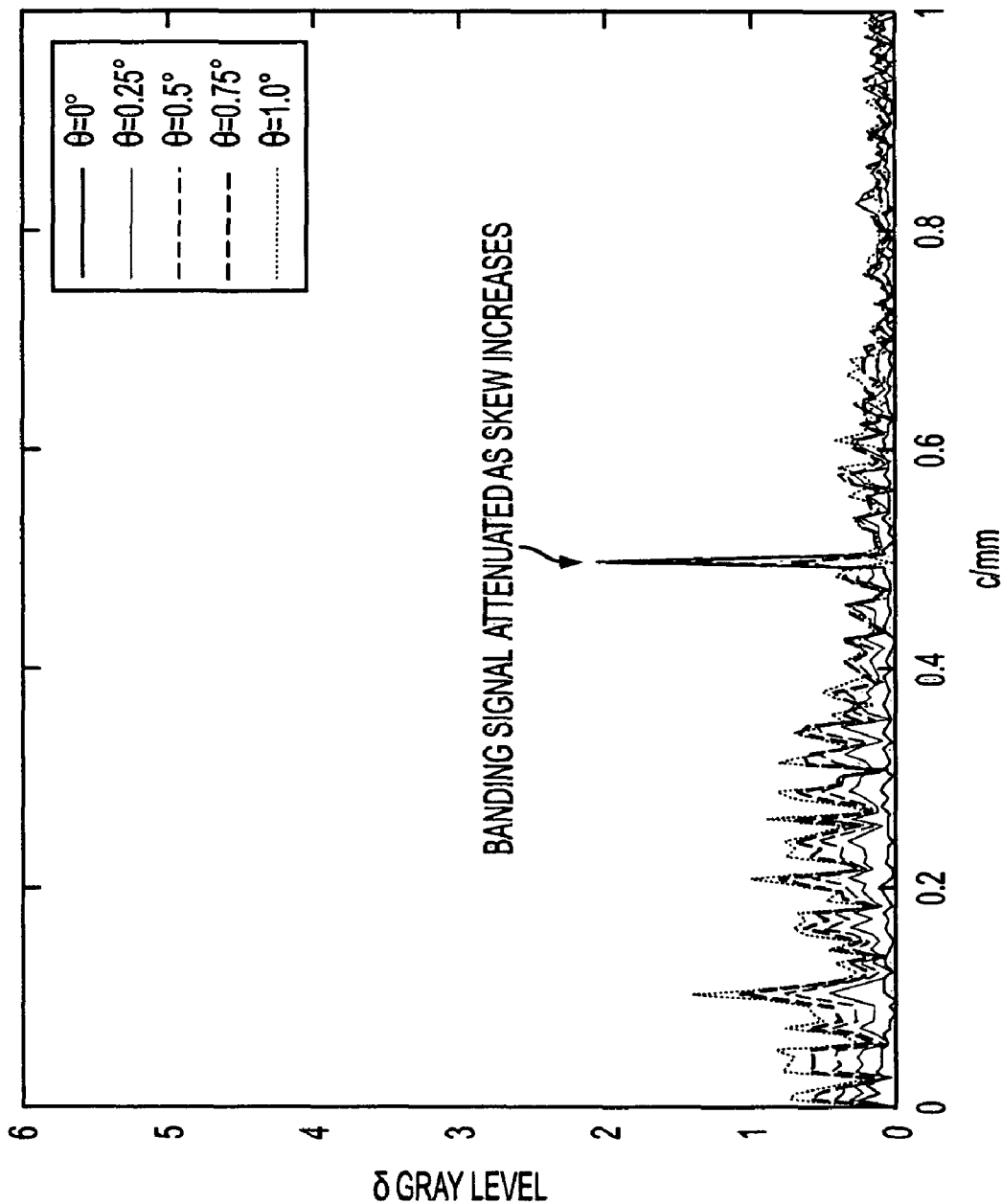
FIG. 11 illustrates the effect of different levels of skew on the amplitude spectrum of difference profiles.

The banding signal in the amplitude spectrum was observed to attenuate as skew increased, as illustrated in FIG. 11, which shows a portion of the amplitude spectrum at around the banding peak for the different skew angles. At 1° (the largest angle tested), the frequency of the 0.5 c/mm banding shifted slightly and the amplitude was only 25% of the value at 0°. There are also false banding signals which may be detected at lower frequencies with this amount of skew.

Figure 12:
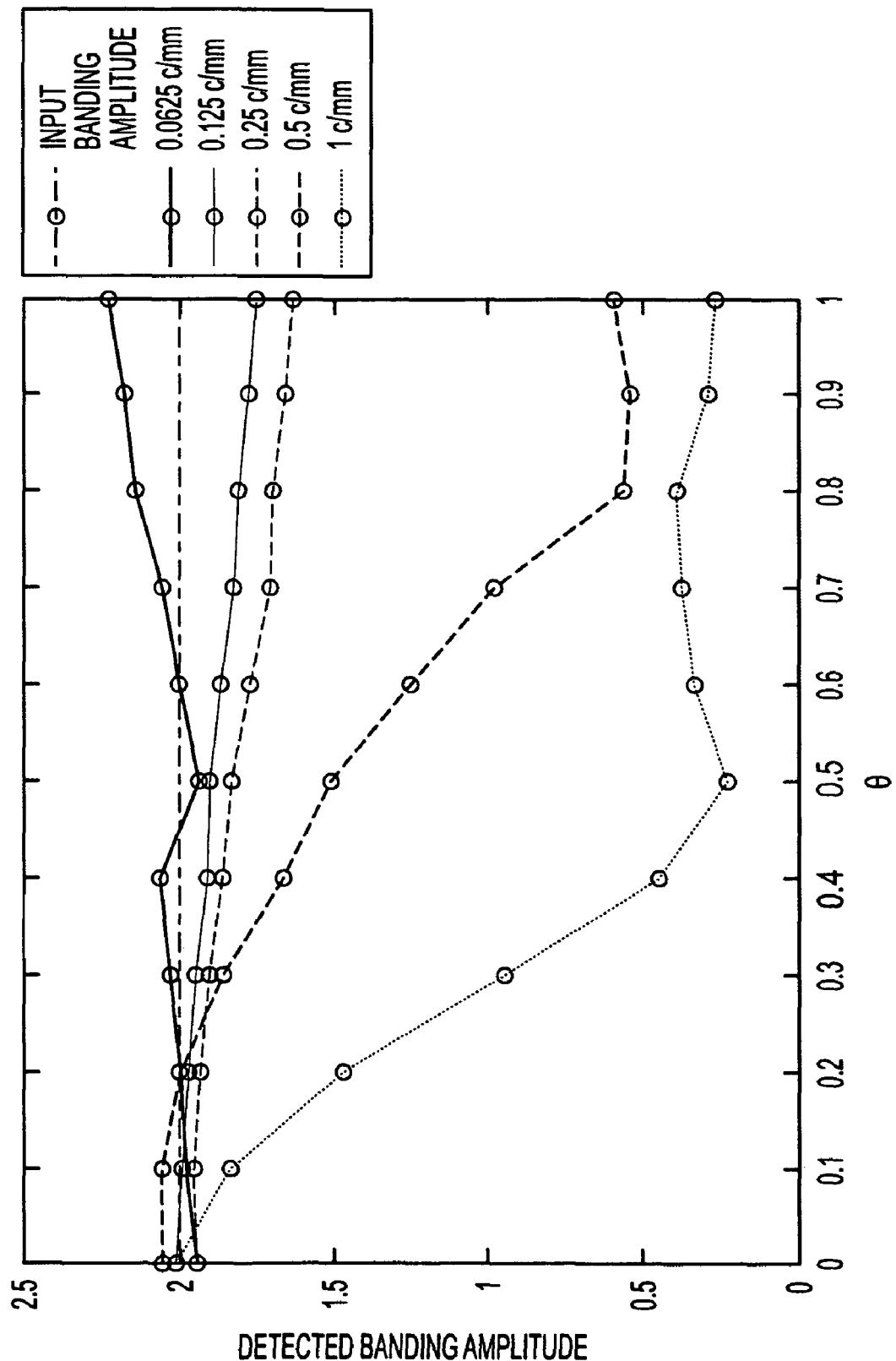
FIG. 12 illustrates the effects of skew and count rate on the amplitude spectrum of difference profiles.

The effect of skew on five different banding frequencies in the range of 0.0625 to 1.0 c/mm was also studied. As seen from FIG. 12, the detected banding amplitude decreases with both the skew angle $\theta$ and banding frequency. As expected, the high frequency banding is more susceptible to skew than is the low-frequency banding. The input banding amplitude was 2, as shown as the dashed line in FIG. 12. It can be seen that for the lowest frequency banding, the detected amplitude can be higher than the actual amplitude due to the large amount of skew (e.g., >0.80 for 0.0625 c/mm banding). These results suggest that a de-skew algorithm should be utilized unless the frequencies of interest are below about 0.25~0.5 c/mm or the banding is particularly pronounced.

From these simulation results, it is quite clear that the exemplary system and method will perform well in detecting banding defects on customer-like images.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of detecting image quality defects, comprising:
   providing an electronic image including electronic image data;
   with a printer, rendering a rendered image on print media based on the electronic image data;
   capturing the rendered image, the captured image including captured image data;
   deriving one-dimensional profiles from the captured image data, each of the captured one-dimensional profiles being derived from a set of image data in the same direction; and
   evaluating at least one of the captured one-dimensional profiles and difference profiles for periodic behavior indicative of image quality defects,
   wherein the evaluation of the difference profiles includes deriving reference one-dimensional profiles from the electronic image data and generating the difference profiles from the reference one-dimensional profiles and captured one-dimensional profiles.

2. A method of detecting image quality defects, comprising:
   providing an electronic image including electronic image data;
   with a printer, rendering a rendered image on print media based on the electronic image data;
   capturing the rendered image, the captured image including captured image data;
   deriving one-dimensional profiles from the captured image data, each of the captured one-dimensional profiles comprising an average of the image data in a set of the image data in the same direction; and
   evaluating at least one of the captured one-dimensional profiles and difference profiles for periodic behavior indicative of image quality defects,
   wherein the evaluation of the difference profiles includes deriving reference one-dimensional profiles from the electronic image data and generating the difference profiles from the reference one-dimensional profiles and captured one-dimensional profiles.

3. A method of detecting image quality defects, comprising:
   providing an electronic image including electronic image data;
   with a printer, rendering a rendered image on print media based on the electronic image data;

capturing the rendered image, the captured image including captured image data;

deriving one-dimensional profiles from the captured image data, each of the captured one-dimensional profiles being derived from a set of image data in the same direction; and evaluating at least one of the captured one-dimensional profiles and difference profiles for periodic behavior indicative of image quality defects, wherein the evaluation of the difference profiles includes:

deriving reference one-dimensional profiles from the electronic image data and generating the difference profiles from the reference one-dimensional profiles and captured one-dimensional profiles; and identifying a frequency of the periodicity in the one-dimensional profiles.

4. The method of claim 3, wherein the identification of a frequency of periodicity includes identifying a peak in an autocorrelation function of the dimensional profiles.

5. The method of claim 1, wherein the image quality defect comprises banding.

6. The method of claim 5, wherein the evaluating includes identifying a frequency of periodicity within the one-dimensional profiles which occurs in a frequency range in which banding normally occurs on an image rendering device on which the image is rendered.

7. The method of claim 1, further comprising processing the captured image data to reduce skew between the captured image and the electronic image.

8. The method of claim 1, wherein the method comprises generating a difference profile.

9. The method of claim 8, further comprising:

modifying the resolution of at least one of the captured image data and the electronic image data so that the captured one-dimensional profiles and reference one-dimensional profiles are derived at a common resolution.

10. The method of claim 8, further comprising:

registering the set of image data for a captured one-dimensional profile with a corresponding set of image data for a reference one-dimensional profile.

11. The method of claim 10, further comprising:

for each data pair of the registered captured and reference one-dimensional profile data sets, determining a difference between the reference data and the corresponding captured image data.

12. The method of claim 1, further comprising:

converting at least one of the captured image data and the reference image data to a common color space.

13. The method of claim 12, wherein the common color space is one of L*a*b* and RGB color space.

14. A system comprising:

memory which stores image data, the image data comprising image data derived from an electronic image and image data derived from a captured image of a rendered image based on the electronic image, the rendered image being rendered by printing the electronic image on a printer;

memory which stores instructions for:

deriving one-dimensional profiles from the captured image data, each of the captured one-dimensional profiles being derived from a set of image data in the same direction, deriving reference one-dimensional profiles from the electronic image data and generating differences profile from the reference one-dimensional profiles and captured one-dimensional profiles, and evaluating at least one of the captured one-dimensional profiles and difference profiles for periodic behavior indicative of image quality defects; and a processing device which executes the instructions.

15. The system of claim 14, further comprising:

a source of the electronic image which communicates with the processing device.

16. The system of claim 14, further comprising:

an image capturing device, in communication with the processing device, which captures the rendered image and communicates captured image data to the processing device.

17. The system of claim 14, further comprising:

an image rendering device in communication with the processor which renders the image, the image rendering device cooperating with the processing device to reduce image defects in rendered images.

18. The system of claim 17, wherein the image rendering device comprises a printer.

19. A computer readable medium comprising instructions for detecting image quality defects, the instructions comprising instructions for performing the method of claim 1.

20. The computer readable medium of claim 19, further comprising at least one of:

instructions for modifying parameters of a first image rendering device on which the captured image is rendered;

instructions for re-routing image data to a second image rendering device for rendering the captured image;

instructions for determining a likely cause of a detected image quality defect; and instructions for alerting an operator to a detected image quality defect when detected.

21. A method of detecting image quality defects, comprising:

providing an electronic image including electronic image data;

rendering a rendered image based on the electronic image data;

capturing the rendered image, the captured rendered image including captured image data comprising gray levels in at least one color separation for pixels of the image;

deriving a plurality of one dimensional difference profiles from the captured image data and the electronic image data, each of the one-dimensional difference profiles being derived by subtraction, from a set of captured rendered image data and a corresponding set of electronic image data in the same direction; and evaluating the one-dimensional difference profiles for evidence of image quality defects.

* * * * *